United States Patent
Satomi

[11] Patent Number: 5,157,612
[45] Date of Patent: Oct. 20, 1992

[54] ANTI-LOCK CONTROL METHOD AND APPARATUS FOR VEHICLES

[75] Inventor: Okubo Satomi, Saitama, Japan

[73] Assignees: Akebono Brake Industry Co., Ltd., Tokyo; Akebono Research and Development Centre Ltd., Hanyu, both of Japan

[21] Appl. No.: 561,580

[22] Filed: Aug. 2, 1990

[30] Foreign Application Priority Data

Aug. 8, 1989 [JP] Japan .................... 1-203826

[51] Int. Cl.$^5$ ............................ A60T 8/62
[52] U.S. Cl. ................... 364/426.02; 303/100; 303/95
[58] Field of Search ............ 364/426.01, 426.02; 303/100, 103, 95, 96; 188/181 C

[56] References Cited

U.S. PATENT DOCUMENTS

| | | | |
|---|---|---|---|
| 4,741,580 | 5/1988 | Matsubara et al. | 303/105 |
| 4,762,375 | 8/1988 | Maki et al. | 303/96 |
| 4,763,260 | 8/1988 | Sakuma et al. | 364/426.02 |
| 4,929,035 | 5/1990 | Shimanuki | 303/106 |

Primary Examiner—Thomas G. Black
Attorney, Agent, or Firm—Cushman, Darby & Cushman

[57] ABSTRACT

A method for controlling an anti-lock system of vehicles comprising steps of determining an estimated vehicle speed in accordance with the highest speed of four vehicle wheels speeds, calculating an average deceleration value at intervals of a constant time of the estimated vehicle speed, judging a frictional coefficient of the road surface on which the vehicle runs, and applying the frictional coefficient commonly to a plurality of control systems.

7 Claims, 4 Drawing Sheets

ANTI-LOCK CONTROL METHOD AND APPARATUS FOR VEHICLES

FIELD OF THE INVENTION

The present invention relates to an anti-lock control method for preventing vehicle wheels from locking at the time of braking operation of the vehicle and apparatus therefor.

BACKGROUND OF THE INVENTION

In general, an anti-lock control apparatus for a vehicle is performed by a control unit including a microcomputer so that hold valves and decay valves are operated to open or close on the basis of electrical signals representing wheel speeds detected by wheel speed sensors, thereby increasing, holding or decreasing the brake hydraulic pressure, for the purpose of securing improved steering performance, running stability, and reducing the braking distance of the vehicle during the braking operation of the vehicle.

FIG. 1 shows a conventional control state diagram as disclosed in U.S. Pat. No. 4,741,580 which illustrates changes in the wheel speed Vw, wheel acceleration and deceleration value dVw/dt and brake hydraulic pressure Pw, as well as corresponding hold signal HS and a decay signal DS for opening and closing hold valves and decay valves.

When no braking operation is performed while the vehicle is running, the brake hydraulic pressure Pw is not increased and both the hold signal HS and the decay signal DS are in the off-state, so that the hold valve opens whereas the decay valve closes. With a brake operation, on the other hand, the brake hydraulic pressure Pw increases rapidly from time point t0 (normal mode), thereby reducing the wheel speed Vw. There is provided a reference wheel speed Vr which is lower by a predetermined amount $\Delta V$ than the wheel speed Vw and follows the latter with that speed difference. The reference wheel speed Vr is so determined that when the wheel deceleration (negative acceleration) value dVw/dt reaches a predetermined threshold value, $-1$ G, for instance, at a time point t1, it decreases linearly from the time point t1 with a deceleration slope $\theta$ of $-1$ G.

At a time point t2 when the wheel deceleration value dVw/dt reaches a predetermined value $-$Gmax ($-2$ G, for example) with maximum absolute value, the hold valve is closed by turning on the hold signal HS to hold the brake hydraulic pressure Pw.

With holding the brake hydraulic pressure Pw, the wheel speed Vw further decreases to be less than the reference wheel speed Vr at a time point t3. At the time point t3 the decay signal DS is turned on to open the decay valve to thereby start reducing the brake hydraulic pressure Pw. As a result of the pressure reduction, the wheel speed Vw changes from its decrease to increase at a time point t4 at which the wheel speed Vw is in a low peak Vl condition. At the time point t4, the decay signal DS is turned off to close the decay valve, so that the reduction of the brake hydraulic pressure Pw is terminated and the brake hydraulic pressure Pw is kept being the same.

Next, when the wheel speed Vw attains a high peak Vh at a time point t5, the brake hydraulic pressure Pw increases again. The increase of the brake hydraulic pressure Pw in this stage is arranged to take place gradually by a repetition of turning on and off the hold signal HS mincingly, thereby reducing in the wheel speed Vw calmly. Starting at a time point t6 (corresponding to t3) the decompression mode is carried out again.

On the other hand, the estimated vehicle speed Vv is calculated as a speed close to the actual vehicle speed. The estimated vehicle speed Vv is calculated by selecting the highest wheel speed VwH among the four vehicle wheels (select-high), and then defining a followable limit of the speed to the selected highest wheel speed VwH within a predetermined range ($\pm 1$ G, for example) in the vehicle acceleration and deceleration conditions sides. A rate of the opening (OFF) and closing (ON) times of the hold valve after the time point t5 shown in FIG. 1, that is, an acceleration rate of the hydraulic pressure, is determined on the basis of a frictional coefficient $\mu$ of the road surface judged in accordance with the deceleration value of the estimated vehicle speed Vv between the time points t1 and t5. Further, not only the acceleration rate but also some parameters such as the value of $\Delta V$ and the termination point of the pressure decrease are varied by judging the frictional coefficient $\mu$ of the road surface in accordance with an inclination of the deceleration of the estimated vehicle speed Vv from the acceleration starting point to the next acceleration starting point in the anti-lock control cycle after the time point t6.

Generally, when the above-described anti-lock control is actually applied to vehicles, a three-system anti-lock control method is widely used, in which method each of the front wheels of the vehicle is controlled independently on the basis of the respective wheel speeds (a first and second system speeds), while the rear wheels thereof are controlled on the basis of the lower one (a third system speed) of the rear wheel speeds (select-low). The frictional coefficient $\mu$ of the road surface is judged in every control systems in accordance with the inclination of deceleration of the estimated vehicle speed Vv between the hydraulic pressure starting point and the next hydraulic pressure starting point.

However, the above-described conventional control method would suffer from the following problems.

As shown in FIG. 2, comparing the wheel speeds of the front-left and front-right wheels, both wheel speeds may not be synchronized at all the time. In this case, one of the hydraulic pressure starting point of the system speed would be different from the other in the two control systems. On the other hand, since the estimated vehicle speed Vv does not decelerate with a constant inclination, even if the frictional coefficient of the road surface is constant, an inclination of deceleration $\Delta v1/\Delta t1$ between the hydraulic pressure starting point of the front-right wheel to the next starting point thereof during the time period $\Delta t1$ would be different from that $\Delta v2/\Delta t2$ between the hydraulic pressure starting point of the front-left wheel to the next starting point thereof during the time period $\Delta t2$. Accordingly, there may occur a case in which a judgement of a frictional coefficient $\mu$ of the road surface is different between the control systems for the front-left wheel and front-right wheel. Thus, the conventional anti-lock control method would not be stable.

SUMMARY OF THE INVENTION

The present invention was made in view of the foregoing problems accompanying the conventional anti-lock control method. Therefore, an object of the invention is to provide an anti-lock control method capable of preventing a frictional coefficient of the road surface from being differently judged in a plurality of control systems.

The above and other objects can be accomplished by a method for controlling an anti-clock system of vehicles which, according to the invention, comprises steps of determining a estimated vehicle speed in accordance with the highest speed of four vehicle wheel speeds, calculating an average deceleration value at intervals of a constant time of the estimated vehicle speed, judging a frictional coefficient of the road surface on which the vehicle runs, and applying the frictional coefficient commonly to a plurality of control systems.

DESCRIPTION OF THE PREFERRED EMBODIMENT

A preferred embodiment of the present invention will be described in detail with reference to accompanying drawings.

Figure 3:
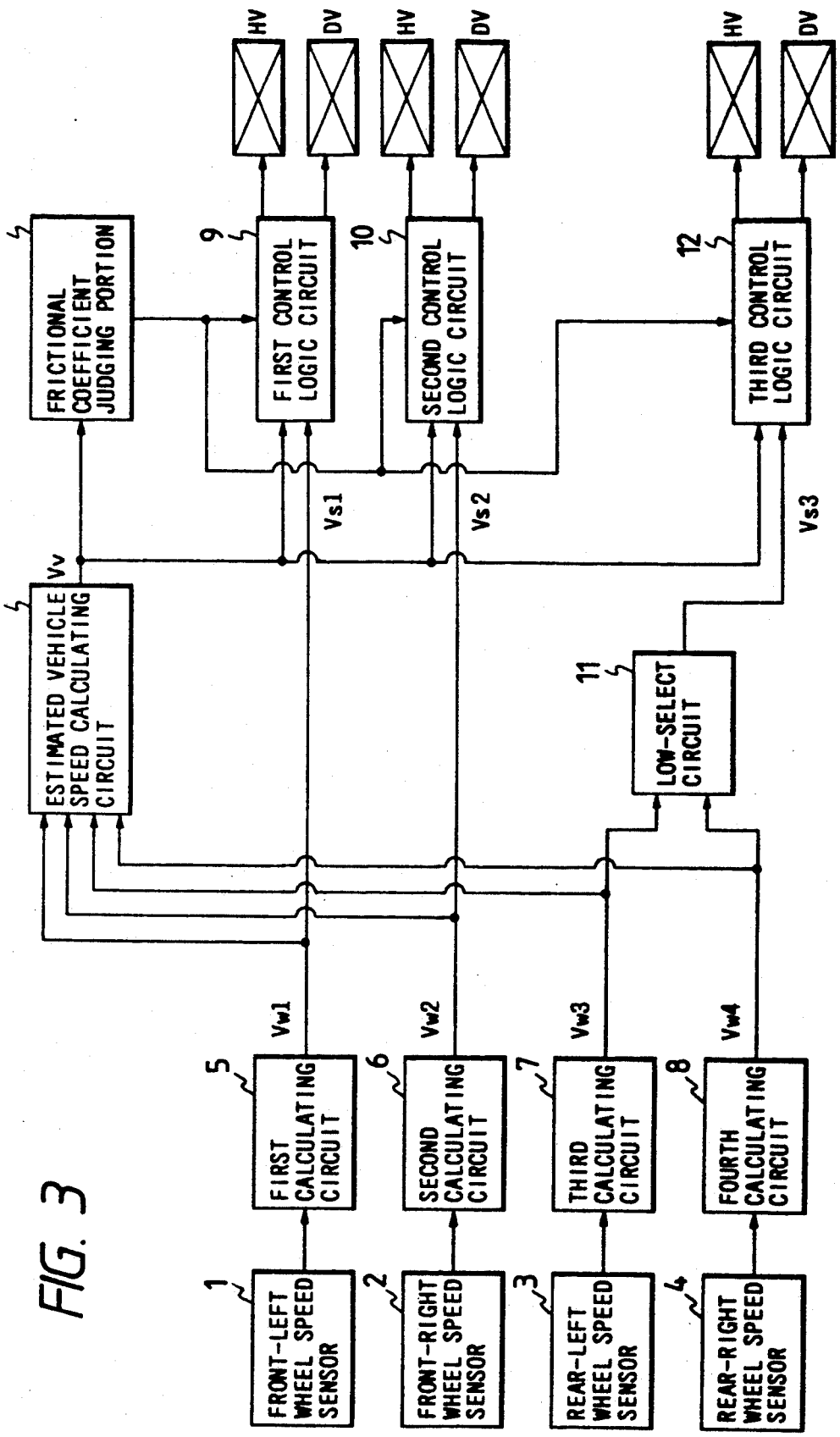
FIG. 3 is a block diagram showing an anti-lock control apparatus according to the present invention.

FIG. 3 is a block diagram showing an anti-lock control apparatus having three systems (channels) to which the present invention is applied. Wheel speed sensors 1, 2 3 and 4 output a signal to calculating circuits 5, 6, 7 and 8, thereby obtaining wheel speed signals Vw1, Vw2 Vw3 and Vw4, respectively. The front-left and front-right wheel speed signals Vw1 and Vw2 are applied as a first and second system speed signals Vs1 and Vs2 directly to first and second control logic circuits 9 and 10, respectively. On the other hand, the rear-left and rear-right wheel speed signals Vw3 and Vw4 are supplied to a low-select circuit 11 by which a lower one of the wheel speed signals is selected. An output of the low-select circuit 11 is supplied as a third system speed signal Vs3 to a third control logic circuit 12. Each of the first, second and third control logic circuits 9, 10 and 11 treats the system speed signals Vs1, Vs2 and Vs3, respectively, as a wheel speed Vw to be controlled, and control a hold valve HV and decay valve DV to open or close on the basis of the wheel speed Vw as a reference signal.

The wheel speed signals Vw1, Vw2, Vw3 and Vw4 are also supplied to an estimated vehicle speed calculating circuit 13 which selects the highest one of the speeds and outputs an estimated vehicle speed Vv defining a followable limit of speed to the highest vehicle speed within a range between ±1 G to the control logic circuits 9, 10 and 12.

On the other hand, the estimated vehicle speed Vv is also supplied to a road surface frictional coefficient $\mu$ judging portion 14 which outputs a result of the judgement to the control logic circuits 9, 10 and 12. Each of the control logic circuits 9, 10 and 12 determines an acceleration rate from each hydraulic pressure starting point in accordance with the result of the judgement by the road surface frictional coefficient $\mu$ judging portion 14.

Figure 1:
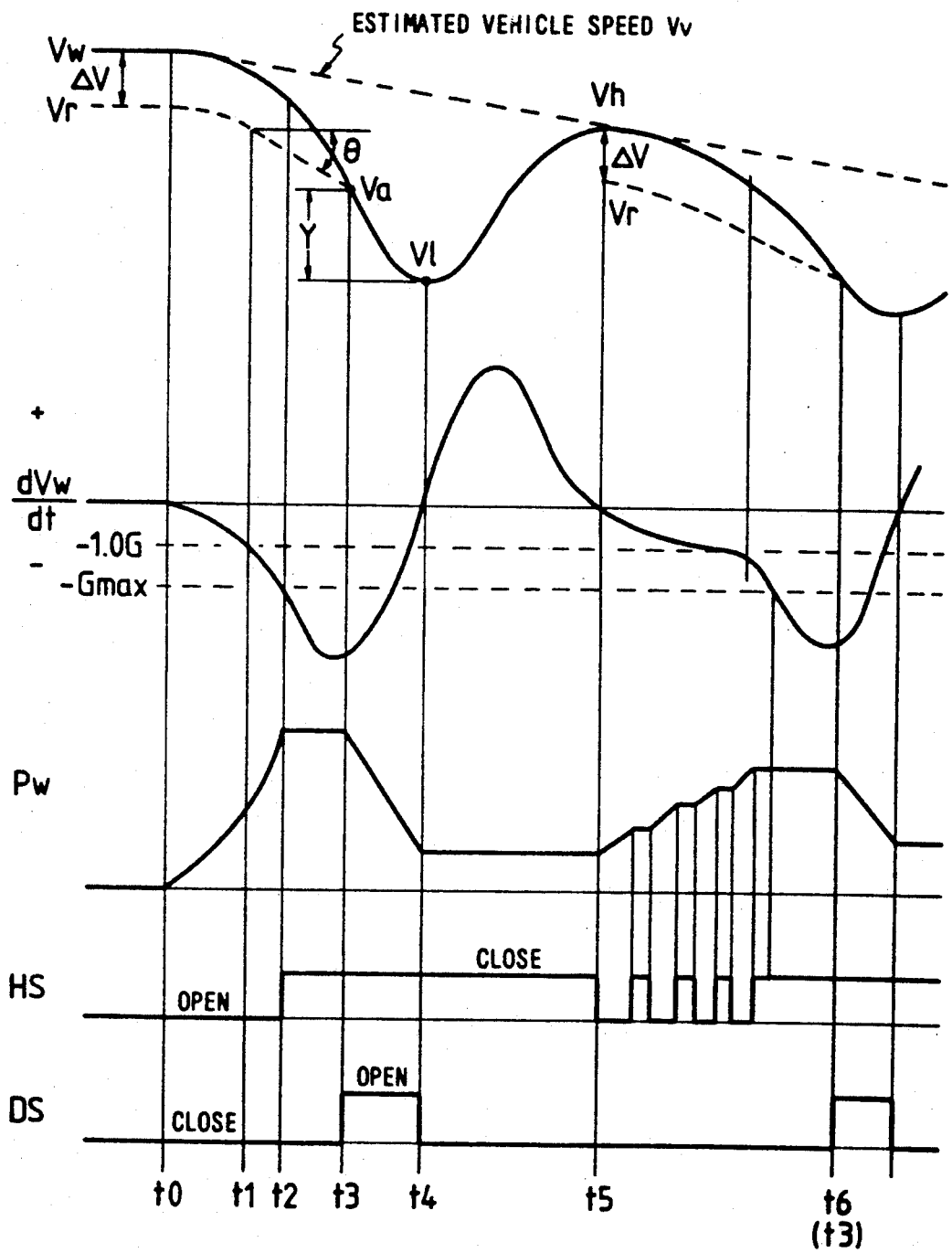
FIG. 1 is a graph showing a control condition of the conventional anti-lock control method.
Figure 2:
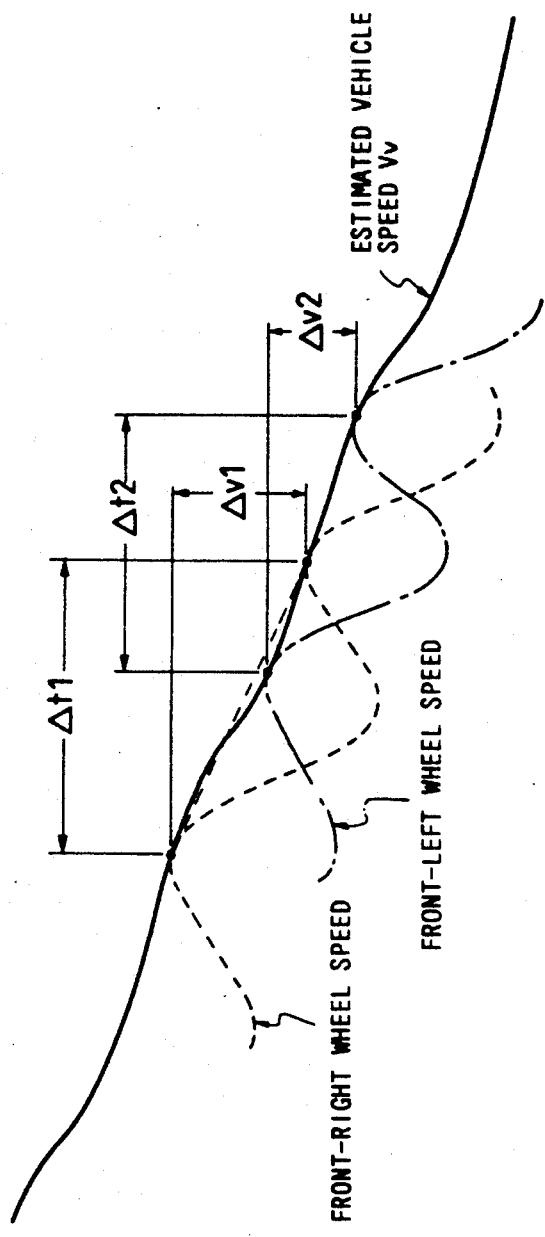
FIG. 2 shows conditions of front-left and front-right wheel speeds as well as an estimated vehicle speed of the conventional anti-lock control method.
Figure 5:
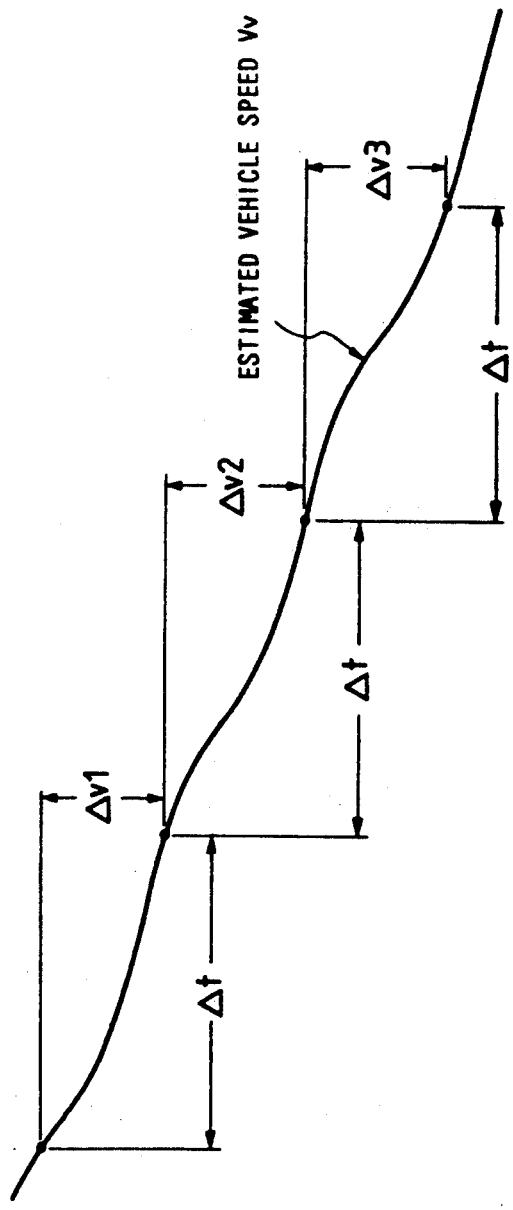
FIG. 5 shows a condition of an estimated vehicle speed of the invention.
Figure 4:
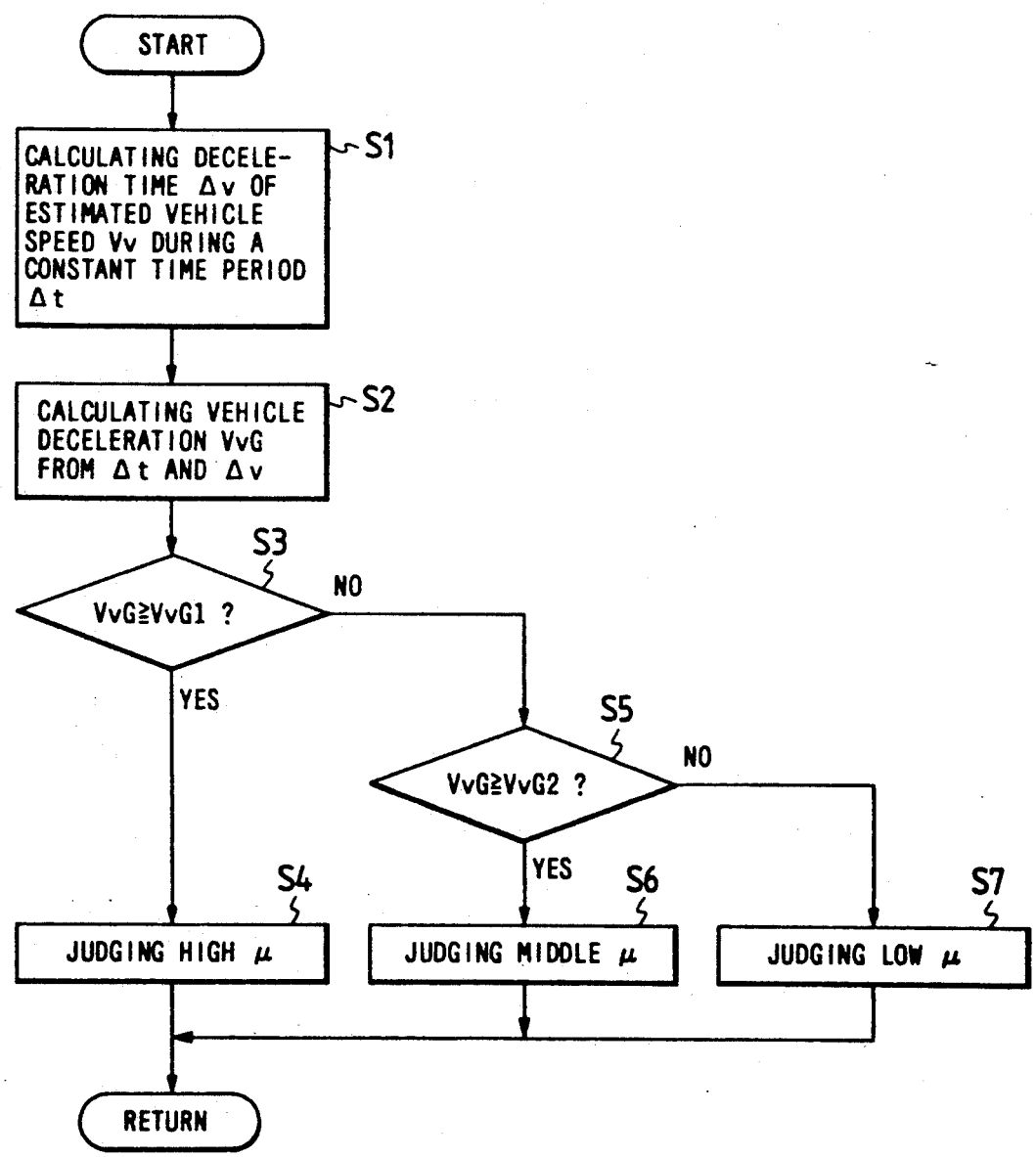
FIG. 4 is a flowchart showing a judgement of a frictional coefficient of the road surface according to the invention.

FIG. 4 is a flowchart of the judgement of the frictional coefficient $\mu$ by the road surface frictional coefficient $\mu$ judging portion 14. FIG. 5 shows conditions of the estimated vehicle speed Vv according to the present invention.

A deceleration time $\Delta v$ of the estimated vehicle speed Vv during a constant time period $\Delta t$ shown in FIG. 5 is calculated at a step S1. Next, in step S2, a deceleration value VvG ($=\Delta v/\Delta t$) of the estimated vehicle speed Vv is determined. Then, a first reference deceleration speed VvG1 which is determined as a reference for the $\mu$ judgement is compared to the deceleration value VvG in step S2. If the deceleration value VvG is equal to or larger than the first reference deceleration speed VvG1, a frictional coefficient $\mu$ of the road surface is judged as "HIGH", and if the deceleration value VvG is less than the first reference deceleration speed VvG1, the deceleration value VvG is compared in step S5 to a second reference deceleration speed VvG2 (VvG2<VvG1) which is determined for judging the coefficient $\mu$. If the deceleration value Vvg is equal to or larger than the second reference speed VvG2, the frictional coefficient $\mu$ of the road surface is judged as "MIDDLE" at step S6. On the other hand, if the deceleration value VvG is less than the reference speed VvG2 at step S5, the frictional coefficient $\mu$ of the road surface is judged as "LOW" at step S7. Thus, the frictional coefficient $\mu$ of the road surface is judged among three different condition, and some parameters for the anti-lock control is determined in accordance with the result of the judgement.

As described above, according to the present invention, a deceleration value of every constant time period of the estimated vehicle speed Vv determined on the basis of the highest wheel speed VwH, that is, an average deceleration value is calculated, and the frictional coefficient of the road surface is judged in accordance with the average deceleration value. The anti-lock control is operated with a common result of the frictional coefficient. Therefore, a stable anti-lock control can be obtained.

What is claimed is:

1. A method of anti-lock control for a vehicle having a plurality of control systems, comprising steps of:
    determining an estimated vehicle speed in accordance with highest speed of four vehicle wheel speeds;
    calculating an average deceleration value at intervals of a constant time period based on the estimated vehicle speed;
    judging a frictional coefficient of the road surface on which the vehicle runs based on the average deceleration value;
    controlling the vehicle's speed based on the frictional coefficient of the road surface.

2. An anti-lock control apparatus for a vehicle, comprising:
    means for detecting wheel speeds;
    means for calculating an estimated vehicle speed on basis of said wheel speeds;
    means for calculating an average deceleration rate of the vehicle at intervals of a constant time period based on said estimated vehicle speed;

means for judging a frictional coefficient of the road surface based on said calculated average deceleration rate; and means for controlling hold and decay valves on the basis of said wheel speeds, said estimated vehicle speed, and said frictional coefficient.

3. The anti-lock control apparatus of claim 2, wherein the control apparatus comprises three control systems.

4. The anti-lock control apparatus of claim 2, wherein means for detecting wheel speeds comprises a first sensor for detecting front-left wheel speed, a second sensor for detecting front-right wheel speed, a third sensor for detecting rear-left wheel speed, and a fourth sensor for detecting rear-right wheel speed.

5. The anti-lock control apparatus of claim 4, further comprising means for selecting a lower one of said rear-left and rear-right wheel speeds.

6. The anti-lock control apparatus of claim 2, wherein means for controlling hold and decay valves comprises a first control circuit for said front-left wheel speed, a second control circuit for said front-right wheel speed, and a third control circuit for said lower one of said rear-left and rear-right wheel speeds.

7. The anti-lock control apparatus of claim 2, wherein said frictional coefficient is judged as one of High, Middle and Low level.

* * * * *